US011821973B2

(12) United States Patent
Wilby

(10) Patent No.: US 11,821,973 B2
(45) Date of Patent: Nov. 21, 2023

(54) TOWED ARRAY SUPERPOSITION TRACKER

(71) Applicant: Raytheon Company, Waltham, MA (US)

(72) Inventor: Andrew Wilby, Warwick, RI (US)

(73) Assignee: Raytheon Company, Waltham, MA (US)

( * ) Notice: Subject to any disclaimer, the term of this patent is extended or adjusted under 35 U.S.C. 154(b) by 218 days.

(21) Appl. No.: 16/419,714

(22) Filed: May 22, 2019

(65) Prior Publication Data

US 2020/0371231 A1    Nov. 26, 2020

(51) Int. Cl.
*G01S 15/66* (2006.01)
*G01S 7/526* (2006.01)

(52) U.S. Cl.
CPC ............ *G01S 15/66* (2013.01); *G01S 7/526* (2013.01)

(58) Field of Classification Search
CPC ........ G01S 15/66; G01S 7/526; G01S 7/5273; G01V 1/28; H04L 67/125
See application file for complete search history.

(56) References Cited

U.S. PATENT DOCUMENTS

| 4,376,301 A * | 3/1983 | Roberts ................ G01V 1/3835 367/19 |
| 4,845,686 A * | 7/1989 | Brac .......................... G01S 5/30 367/19 |
| 4,992,990 A * | 2/1991 | Langeland ........... G01V 1/3835 367/19 |
| 5,027,333 A * | 6/1991 | Halling .................. H04B 11/00 367/5 |

(Continued)

FOREIGN PATENT DOCUMENTS

| CN | 107179535 | 9/2017 |
| EP | 1 085 306 A2 | 3/2001 |

(Continued)

OTHER PUBLICATIONS

Notification of Transmittal of the International Search Report and the Written Opinion of the ISA dated Jun. 19, 2020 for International Application No. PCT/US2020/020948; 1 page.

(Continued)

*Primary Examiner* — Isam A Alsomiri
*Assistant Examiner* — Vikas Atmakuri
(74) *Attorney, Agent, or Firm* — Daly, Crowley, Mofford & Durkee, LLP

(57) ABSTRACT

A method is disclosed comprising: transmitting a pair of tracking signals, the pair of tracking signals including a first tracking signal and a second tracking signal; receiving a data set that is collected by using a sensor in a sensor array, the data set including: (i) a received first tracking signal that is generated by the sensor in response to receiving the first tracking signal, (ii) a received second tracking signal that is generated by the sensor in response to receiving the second tracking signal, and (iii) a received target signal; detecting a relative delay at which the first tracking signal and the second tracking signal are received by the sensor; removing the received first tracking signal and the received second tracking signal from the data set to produce a filtered data set; and providing the filtered data set and an indication of the relative delay to a beamformer.

20 Claims, 6 Drawing Sheets

(56) References Cited

U.S. PATENT DOCUMENTS

| | | | | |
|---|---|---|---|---|
| 5,166,905 A * | 11/1992 | Currie | G01S 5/30 | 367/19 |
| 5,680,863 A * | 10/1997 | Hossack | G10K 11/32 | 600/459 |
| 5,735,282 A * | 4/1998 | Hossack | A61B 8/4494 | 600/458 |
| 6,208,584 B1 * | 3/2001 | Skinner | G01H 3/005 | 367/13 |
| 6,262,943 B1 * | 7/2001 | Clarke | G01V 1/003 | 367/901 |
| 6,697,300 B1 * | 2/2004 | Holt | G01S 5/0284 | 367/127 |
| 7,289,388 B2 * | 10/2007 | Intrator | G01S 7/52004 | 367/100 |
| 9,152,276 B2 * | 10/2015 | Dahl | G06F 3/043 | |
| 9,759,828 B2 * | 9/2017 | Groenaas | G01V 1/3817 | |
| 10,048,366 B1 * | 8/2018 | Hong | G01S 7/42 | |
| 10,247,823 B2 * | 4/2019 | Brown | G01S 7/6281 | |
| 10,355,892 B2 * | 7/2019 | Hildinger | H04L 25/03343 | |
| 10,552,762 B2 * | 2/2020 | Firooz | G05B 13/0265 | |
| 2004/0015084 A1 * | 1/2004 | Flesch | A61B 8/4483 | 600/466 |
| 2005/0207589 A1 * | 9/2005 | Biegelsen | G01S 15/325 | 367/137 |
| 2006/0007784 A1 * | 1/2006 | Lerro | G01S 15/32 | 367/98 |
| 2006/0235635 A1 | 10/2006 | Intrator et al. | | |
| 2007/0042706 A1 * | 2/2007 | Ledeczi | G01S 5/0289 | 455/3.01 |
| 2007/0167802 A1 * | 7/2007 | Rigby | G01S 7/52046 | 600/459 |
| 2009/0231197 A1 * | 9/2009 | Richards | H01Q 3/26 | 342/377 |
| 2009/0245019 A1 * | 10/2009 | Falkenberg | G01V 1/3835 | 367/17 |
| 2009/0296519 A1 * | 12/2009 | Keers | G01V 1/3835 | 367/19 |
| 2010/0198528 A1 * | 8/2010 | McCauley | A63B 24/0021 | 702/41 |
| 2010/0265800 A1 * | 10/2010 | Eatwell | G01S 5/186 | 367/127 |
| 2012/0133544 A1 * | 5/2012 | Rudd | G01S 15/101 | 342/22 |
| 2013/0276542 A1 * | 10/2013 | Herzog | A61B 5/0073 | 73/655 |
| 2013/0343160 A1 * | 12/2013 | Obara | G01S 7/52004 | 367/106 |
| 2014/0269198 A1 * | 9/2014 | Ray | G01S 3/808 | 367/123 |
| 2015/0323667 A1 * | 11/2015 | Przybyla | G10K 11/346 | 367/103 |
| 2015/0369908 A1 * | 12/2015 | Zimmerman | G01S 15/96 | 367/7 |
| 2016/0259054 A1 * | 9/2016 | Proctor | G01S 7/526 | |
| 2017/0038344 A1 * | 2/2017 | Capus | G01N 29/34 | |
| 2017/0082739 A1 * | 3/2017 | Horner | G01S 7/52003 | |
| 2018/0017671 A1 * | 1/2018 | Warke | G01S 13/08 | |
| 2018/0246193 A1 * | 8/2018 | Kline | B06B 1/0215 | |
| 2019/0049582 A1 * | 2/2019 | Hayashi | G01S 7/487 | |
| 2019/0072951 A1 * | 3/2019 | Clark | B64D 47/02 | |
| 2019/0196578 A1 * | 6/2019 | Iodice | G06F 3/011 | |
| 2020/0294401 A1 * | 9/2020 | Kerecsen | G05D 1/0287 | |

FOREIGN PATENT DOCUMENTS

| | | |
|---|---|---|
| EP | 1 085 306 A3 | 3/2001 |
| WO | WO 03/079047 A2 | 9/2003 |
| WO | WO 03/079047 A3 | 9/2003 |

OTHER PUBLICATIONS

International Search Report dated Jun. 19, 2020 for International Application No. PCT/US2020/020948; 5 pages.
Written Opinion of the ISA dated Jun. 19, 2020 for International Application No. PCT/US2020/020948; 8 pages.
International Preliminary Report on Patentability dated Dec. 2, 2021 for PCT Application No. PCT/US2020/020948; 8 pages.

* cited by examiner

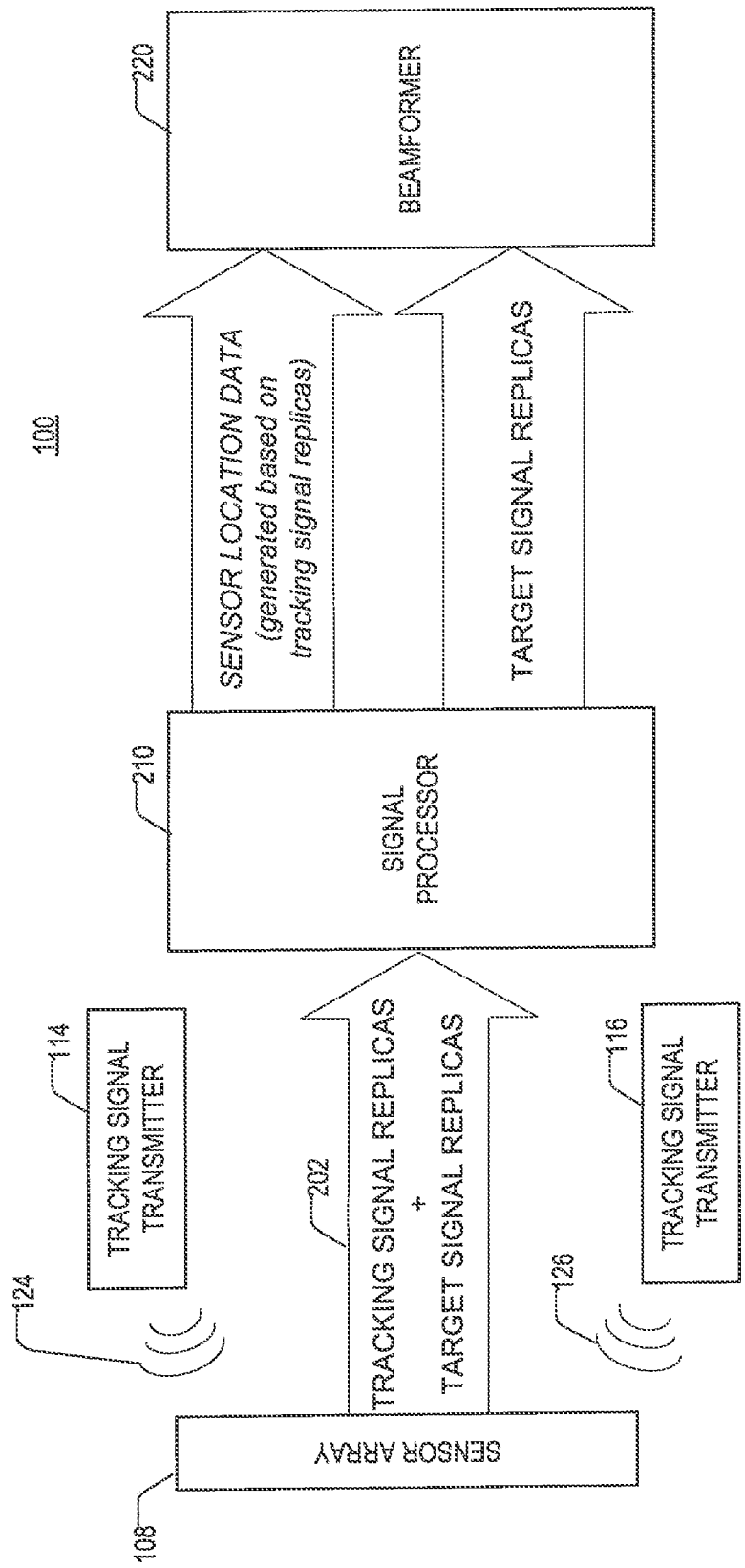

TOWED ARRAY SUPERPOSITION TRACKER

BACKGROUND

Conventional towed array systems employ flexible towed arrays for the measurement of low frequency signals. A flexible towed array may include a large number of sensors and it may exceed 100 meters in length. When a flexible towed array is being towed by a towing platform, the shape of the towed array may change when the towing platform takes a turn. Such changes in the shape of the towed array may affect negatively the operation of signal processing equipment used to process signals supplied by the towed array. One solution to this problem is to ignore all data provided by the towed array, unless a straight-line tow is established. Another solution to the same problem is to use a trailback model to estimate the shape of the towed array. These solutions, however, have disadvantages associated with them. More particularly, many trailback models tend not to perform reliably because the movements of towed arrays are frequently chaotic. And the indiscriminate discarding of data unless a straight-line tow is established may result in the loss of useful data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: transmitting a pair of tracking signals, the pair of tracking signals including a first tracking signal and a second tracking signal; receiving a data set that is collected by using a sensor in a sensor array, the data set including: (i) a received first tracking signal that is generated by the sensor in response to receiving the first tracking signal, (ii) a received second tracking signal that is generated by the sensor in response to receiving the second tracking signal, and (iii) a received target signal; detecting a relative delay at which the first tracking signal and the second tracking signal are received by the sensor based on the received first tracking signal and the received second tracking signal, removing the received first tracking signal and the received second tracking signal from the data set to produce a filtered data set; and providing the filtered data set and an indication of the relative delay to a beamformer, wherein the first tracking signal has a first duration, and the data set is collected over a collection period having a second duration that is greater than the first duration.

According to aspects of the disclosure, a system is provided comprising: a first transmitter configured to transmit a first tracking signal; a second transmitter configured to transmit a second tracking signal; a sensor array that is arranged to receive the first tracking signal, the second tracking signal, and one or more other signals; and at least one processor configured to perform the operations of: receiving a data set that is collected by using a sensor in the sensor array, the data set including: (i) a received first tracking signal that is generated by the sensor in response to receiving the first tracking signal, (ii) a received second tracking signal that is generated by the sensor in response to receiving the second tracking signal, and (iii) a received target signal; detecting a relative delay at which the first tracking signal and the second tracking signal are received by the sensor based on the received first tracking signal and the received second tracking signal, removing the received first tracking signal and the received second tracking signal from the data set to produce a filtered data set; and providing the filtered data set and an indication of the relative delay to a beamformer, wherein the first tracking signal has a first duration, and the data set is collected over a collection period having a second duration that is greater than the first duration.

According to aspects of the disclosure, a non-transitory computer-readable medium is provided that is configured to store one or more processor-executable instructions, which when executed by at least one processor cause the at least one processor to perform the operations of: transmitting a pair of tracking signals, the pair of tracking signals including a first tracking signal and a second tracking signal; receiving a data set that is collected by using a sensor in a sensor array, the data set including: (i) a received first tracking signal that is generated by the sensor in response to receiving the first tracking signal, (ii) a received second tracking signal that is generated by the sensor in response to receiving the second tracking signal, and (iii) a received target signal; detecting a relative delay at which the first tracking signal and the second tracking signal are received by the sensor based on the received first tracking signal and the received second tracking signal, removing the received first tracking signal and the received second tracking signal from the data set to produce a filtered data set; and providing the filtered data set and an indication of the relative delay to a beamformer, wherein the first tracking signal has a first duration, and the data set is collected over a collection period having a second duration that is greater than the first duration.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2 is a diagram illustrating the operation of the sonar system of FIG. 1A, according to aspects of the disclosure;

DETAILED DESCRIPTION

Figure 1A:
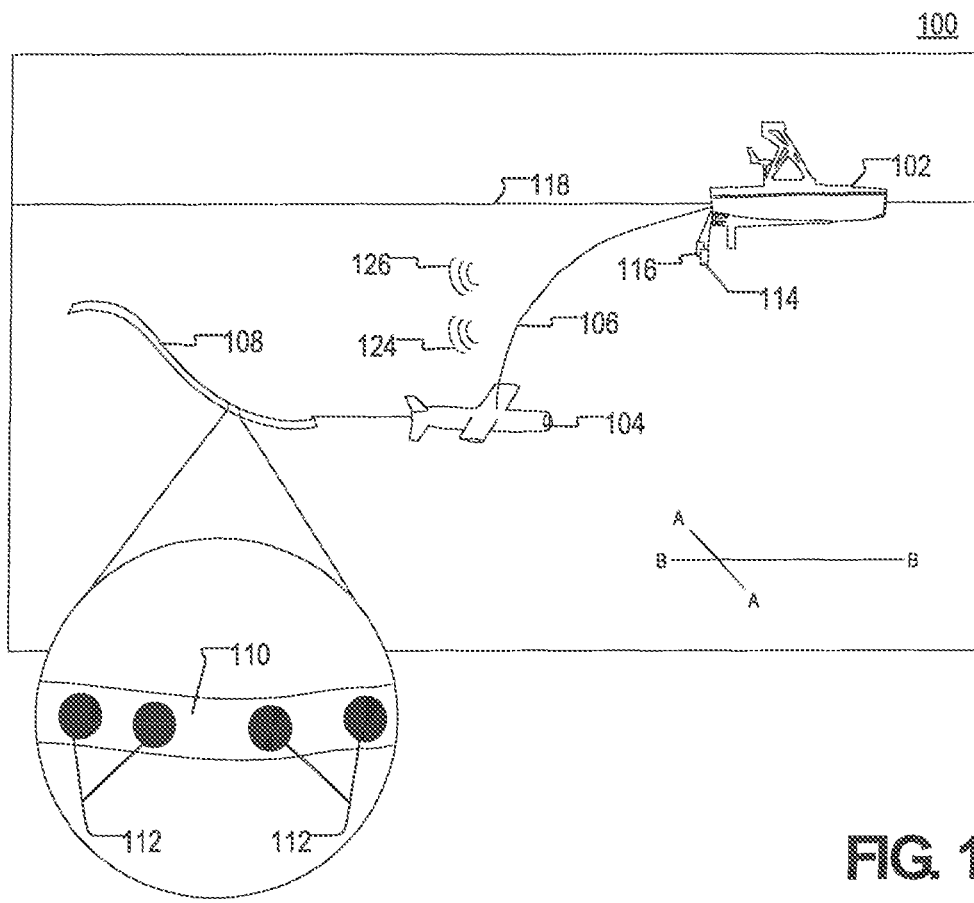
FIG. 1A is a diagram of an example of a sonar system, according to aspects of the disclosure.

FIG. 1A is a diagram of an example of a sonar system 100, according to the aspects of the disclosure. The sonar system 100 may include any suitable type of active or passive sonar system. The sonar system 100 may include a towing platform 102 (e.g., a boat or a ship) that is coupled to a tow body 104 via a cable 106. A flexible sensor array 108 may be coupled to the tow body 104, as shown. The sensor array 108 may include a plurality of sensors 112 (e.g., hydrophones) disposed along a length of a flexible base 110 (e.g., a cable). In some implementations, the sensor array 108 may have 3 kHz of bandwidth centered on 8.5 kHz. Tracking signal transmitters 114 and 116 may be attached to the towing platform 102, and submerged under the water surface 118, below the wake of the towing platform 102. The transmitters 114 and 116 may be laterally spaced from each other along an axis A-A of the towing platform 102, which is transverse (e.g., orthogonal) to a longitudinal axis B-B of the towing platform 102. For example, in some implementations, the transmitters 114 and may be attached to points on opposite ends of the towing platform's 102 rear wall.

In operation, the transmitters 114 and 116 may be configured to transmit tracking signals that are used for the purpose of determining the shape of the sensor array 108. More particularly, the transmitter 114 may be configured to transmit tracking signals 124, and the transmitter 116 may be configured to transmit tracking signals 126. In some implementations, each of the tracking signals 124 may include a pulse having a frequency that is within the operational frequency band of the sensor array 108. In some implementations, each of the tracking signals 126 may also include a pulse having a frequency that is within an operational frequency band of the sensor array 108. According to the present example, the tracking signals 124 and 126 have approximately the same frequency. However, it will be understood that alternative implementations are possible in which the tracking signals 124 and 126 have different frequencies. Moreover, according to the present example, the tracking signals 126 are transmitted concurrently (e.g., simultaneously, etc.). However, it will be understood that alternative implementations are possible in which the tracking signals are transmitted sequentially.

Figure 1B:
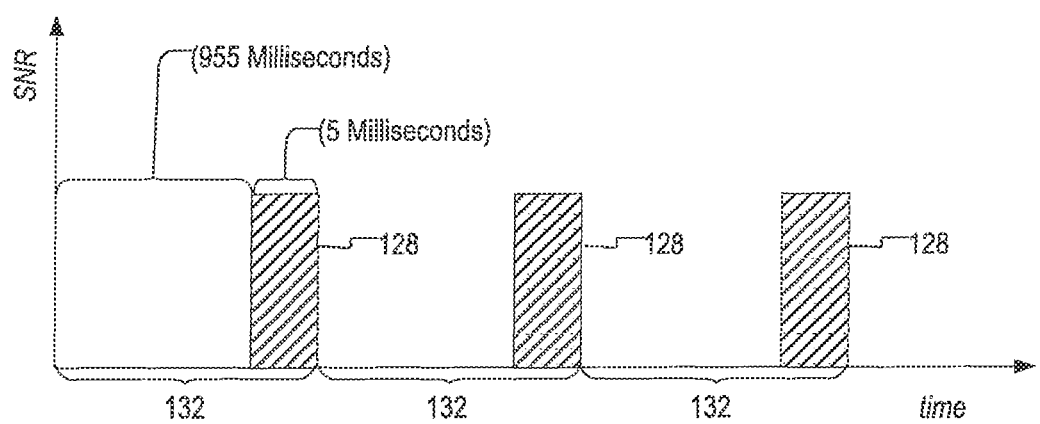
FIG. 1B is a plot illustrating a pattern at which tracking signals are transmitted by the sonar system of FIG. 1A, according to aspects of the disclosure.

FIG. 1B is a diagram illustrating the pattern at which the tracking signals 124 and 126 are transmitted by the transmitters 114 and 116, respectively. As illustrated in FIG. 1B, the tracking signals 124 and 126 may be transmitted periodically and in pairs 128. Each pair 128 may include first tracking signal 124 and second tracking signal 126. The pairs 128 may be transmitted at transmission intervals 132. Each of the transmission intervals 132 may have a duration of is, for example. The duration of the tracking signals 124 and 126 that are transmitted during any of the transmission intervals 132 may be 5 ms, for example.

When each of the transmitted tracking signals 124 is received by any of the sensors 112 in the sensor array 108, a representation of the tracking signal 124 is included in the waveform that is generated by the sensor 112. This representation is herein referred to as "a received tracking signal 124 that is generated in response to the tracking signal 124." Similarly, when each of the transmitted tracking signals 126 is received by any of the sensors 112 in the sensor array 108, a representation of the tracking signal 126 is included in the waveform that is generated by the sensor 112. This representation is herein referred to as "a received tracking signal 126 that is generated in response to the transmitted tracking signal 126."

As is further below, when data is received using the sensor array 108, the received tracking signals 124 and 126 are removed (e.g., blanked out) from the data along with other signals that happened to be received by the sensor array 108 at the same time, after which the data is provided to a beamformer for further processing. Removing the received tracking signals from the data may prevent the tracking signals from interfering with the operation of the beamformer. Normally, using the same band for a search and tracking system would be discouraged because of mutual interference. However, because the duration of the tracking signals 124 and 126 is minuscule compared to the duration of each transmission interval 132, the removal of the received tracking signals may result in less than 0.1 db degradation in SNR. This cost can be relatively small in comparison to the improvement in the performance of the sensor array (or beamformer) in a non-straight-line tow, which results from using the tracking signals 124 and 126 to track the shape of the towed array. Although in the present example the duration of the tracking signals 124 and 126 is 200 times smaller than the duration of each transmission interval 132, the present disclosure is not limited to any specific duration of the tracking signals. In this regard, it will be understood that alternative implementations are possible in which the tracking signals 124 and 126 have any duration that is one or more orders of magnitude smaller than the duration of each transmission interval 132.

FIG. 2 is a diagram illustrating the operation of the sonar system 100, in accordance with one example. As illustrated, the sonar system 100 may include a signal processor 210 and a beamformer 220. According to the present example, the signal processor 210 and the beamformer 220 are implemented in software and are executed on an electronic device, such as the electronic device 600 (shown in FIG. 6). However, alternative implementations are possible in which any of the signal processor 210 and the beamformer 220 is implemented in hardware or as a combination of hardware and software. Although in the present example, the signal processors 210 and 220 are depicted as separate blocks, it will be understood that in some implementations they may be integrated into the same unit. Stated succinctly, the present disclosure is not limited to any specific implementations of the signal processor 210 and/or the beamformer 220.

In operation, the sensor array 108 may feed a signal return 202 to the signal processor 210. The signal return 202 may include (i) received tracking signals 124, (ii) received tracking signals 126, and (iii) one or more other target signals that are detected by the sensors 112 in the sensor array. The signal processor 210 may be configured to remove the received tracking signals from the signal return 202 and feed only the target signals to the beamformer 220. The removal of the received tracking signals 124 and 126 may be readily accomplished because the tracking signals 124 and 126 have a higher signal-to-noise ratio (SNR) than other signals received by the sensor array 108 (as a result of the sensor array's 108 close proximity to the transmitters 114 and 116). Additionally or alternatively, in some implementations, the received tracking signals 124 and 126 may be removed from the signal return 202 by using a matching filter or a replica correlator. However, it will be understood that the present disclosure is not limited to any specific method for removing the received tracking signals 124 and 126 from the signal return 202.

The signal processor 210 may be further configured to generate location data and feed the location data to the beamformer 220 for further processing. The location data may identify the respective positions of the sensors 112 during consecutive time windows. More particularly, for each time window, the location data may identify the respective position of each (or at least some) of the sensors 112 in the sensor array 108, relative to the towing platform 102 and/or the transmitters 114 and 116. Accordingly, the location data may describe the shape of the sensor array 108 during each of the time windows. Providing the location data to the beamformer 220 is advantageous because the location data may be used in a well-known fashion to improve the beamformer's 220 performance when the sensor array 108 is in a non-straight-line tow.

Figure 3:
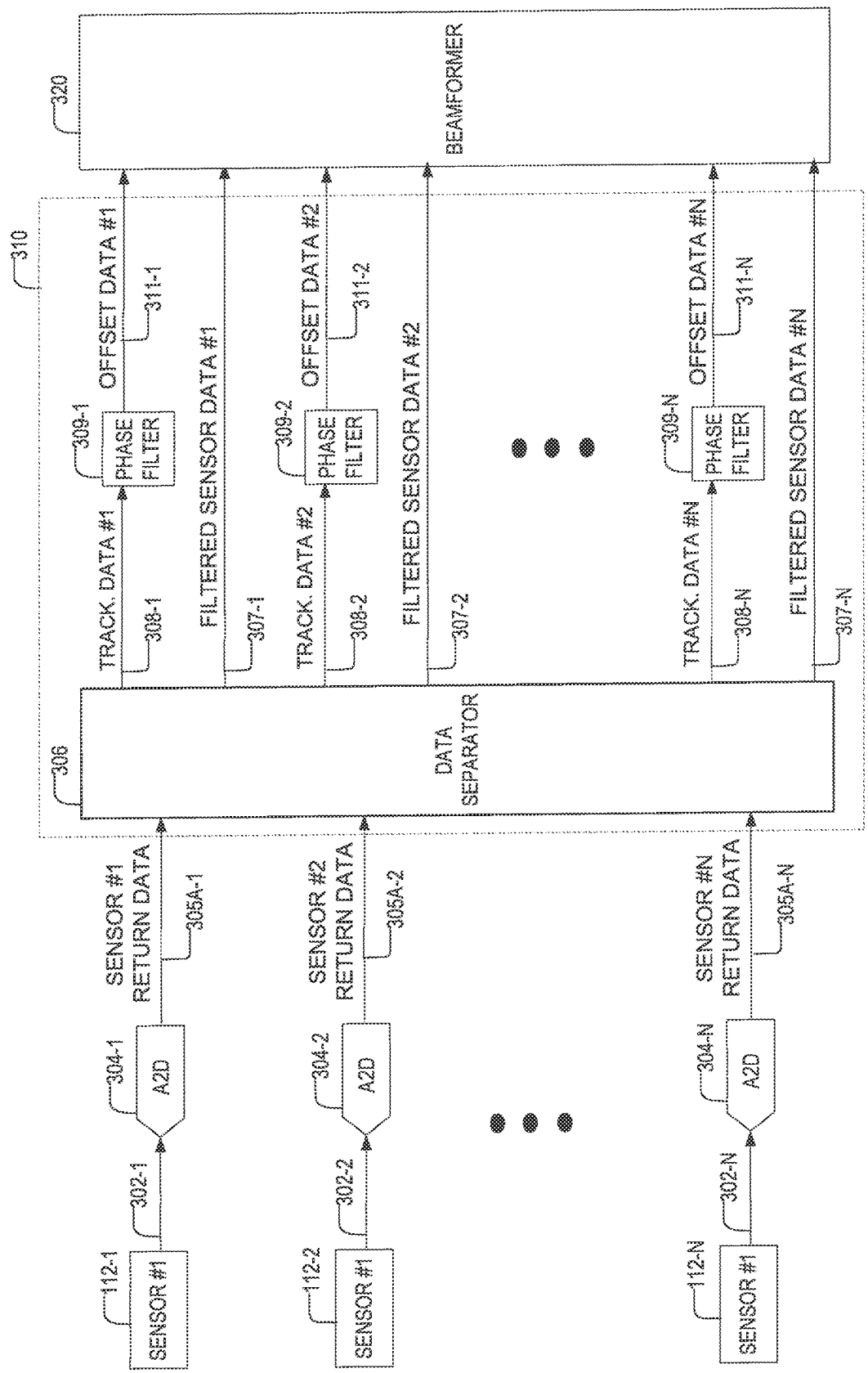
FIG. 3 is a diagram illustrating the operation of the sonar system of FIG. 1A, according to aspects of the disclosure.

FIG. 3 is a diagram illustrating the operation of the sonar system 100, in accordance with another example. As illustrated, the sonar system 100 may include a signal processor 310 and a beamformer 320. According to the present example, the signal processor 310 and the beamformer 320 are implemented in software and are executed on an electronic device, such as the electronic device 600 (shown in FIG. 6). However, alternative implementations are possible in which any of the signal processor 310 and the beamformer 320 is implemented in hardware or as a combination of hardware and software. According to the present example, the signal processor 310 includes a data separator 306 and a plurality of phase filters 309. Although in the present example, the signal processors 310 and 320 are depicted as separate blocks, it will be understood that in some implementations they may be integrated into the same unit. Stated succinctly, the present disclosure is not limited to any specific implementations of the signal processor 310 and/or the beamformer 320.

In operation, each of the sensors 112 of the sensor array 108 may feed a respective waveform 302 to a respective analog-to-digital converter (ADC) 304. For example, the sensor 112-1 may feed a waveform 302-1 to an ADC 304-1; the sensor 112-2 may feed a waveform 302-2 to an ADC 304-2; and the sensor 112-N may feed a waveform 302-N to an ADC 304-N, where N is any positive integer greater than 2. As noted above, each waveform 302 may include pairs or received tracking signals 124 and 128 that are generated in response to the transmission of the tracking signal pairs 128, as well as one or more other signals (target signals) that are picked up by the sensor that generates the waveform. In some implementations, any of the one or more other signals (target signals) may have the same frequency as the tracking signal 124 and/or the tracking signal 126.

Each ADC 304 may sample the waveform 302 that is supplied to it to generate a respective data stream 305, which is subsequently fed to the data separator 306. Specifically, the ADC 304-1 may feed to the data separator 306 a data stream 305-1, which is generated based on the waveform 302-1; the ADC 304-2 may feed to the data separator 306 a data stream 305-2, which is generated based on the waveform 302-2; and the ADC 304-N may feed to the data separator 306 a data stream 305-N, which is generated based on the waveform 302-N.

The data separator 306 may be configured to feed a plurality of data streams 307 to the beamformer 320. Each of the data streams 307 may be generated by the data separator 306 based on a different one of the data streams 305. Specifically, the data stream 307-1 may be generated by zeroing out data samples from the data stream 305-1, which represent received tracking signals 124 and 126. As a result, the data stream 307-1 may include samples that correspond to target signals (or portions thereof) that are picked up by the sensor 112-1 in periods when no interference from the tracking signals 124 and 126 is present. The data stream 307-2 may be generated by zeroing out data samples from the data stream 305-2, which represent received tracking signals 124 and 126. As a result, the data stream 307-2 may include samples that correspond to target signals (or portions thereof) that are picked up by the sensor 112-2 in periods when no interference from the tracking signals 124 and 126 is present. And the data stream 307-N may be generated by zeroing out data samples from the data stream 305-N, which represent received tracking signals 124 and 126. As a result, the data stream 307 may include samples that correspond to target signals (or portions thereof) that are picked up by the sensor 112-N in periods when no interference from the tracking signals 124 and 126 is present.

The data separator 306 may be further configured to generate a plurality of data streams 308 and feed the data streams 308 to the phase filters 309. Each of the data streams 308 may be generated based on a different one of the data streams 305. Each of the data streams 308 may include pairs of received tracking signals 124 and 126 that are generated by a different one of the sensors 112. More particularly, the data stream 308-1 may be generated based on the data stream 305-1, and it may be fed to a phase filter 309-1. The data stream 308-1 may include pairs of received tracking signals 124 and 126, wherein each of the pairs of received tracking signals 124 and 126 is generated by the sensor 112-1. The data stream 308-2 may be generated based on the data stream 305-2, and it may be fed to a phase filter 309-2. The data stream 308-2 may include pairs of received tracking signals 124 and 126, wherein each of the pairs of received tracking signals 124 and 126 is generated by the sensor 112-2. And the data stream 308-N may be generated based on the data stream 305-N, and it may be fed to a phase filter 309-N. The data stream 308-N may include pairs of received tracking signals 124 and 126, wherein each of the pairs of received tracking signals 124 and 126 is generated by the sensor 112-N. Each phase filter 309 may generate a respective offset data stream 311 and supply the generated offset data stream 311 to the beamformer 320. Specifically, the phase filter 309-1 may generate an offset data stream 311-1 based on the data stream 308-1, and supply the offset data stream 311-1 to the beamformer 320. The offset data stream 311-1 may include respective indications of a phase offset between received tracking signals 124 and 126, wherein each indication of phase offset identifies the phase offset between a respective received tracking signal 124 and a respective received tracking signal 126 that are associated with the same tracking signal pair 128. The phase filter 309-2 may generate an offset data stream 311-2 based on the data stream 308-1 that is supplied to the phase filter 309-2. The offset data stream 311-2 may include respective indications of a phase offset between received tracking signals 124 and 126, wherein each indication of phase offset identifies the phase offset between a respective received tracking signal 124 and a respective received tracking signal 126 that are associated with the same tracking signal pair 128. And the phase filter 309-N may generate an offset data stream 311-N based on the data stream 308-N that is supplied to the phase filter 309-N. The offset data stream 311-N may include respective indications of a phase offset between received tracking signals 124 and 126, wherein each indication of phase offset identifies the phase offset between a respective received tracking signal 124 and a respective received tracking signal 126 that are associated with the same tracking signal pair 128.

FIG. 3 is provided for illustrative purposes only. Although FIG. 3 depicts that the offset data for each of the sensors 112 is generated only based on waveforms 302 provided by this sensor, it will be understood that alternative implementations are possible in which signals provided by other sensors are also used as a basis for determining offset data. For example, in some implementations, the offset data stream 311-1 may be generated based on both the data stream 308-1 and the data stream 308-2, so as to properly recognize (as such) instances in which the received tracking signals 124 and 126 are off-phase by multiples of 180 degrees. Although in the example of FIG. 3 a plurality of data streams 307 and 310 is fed to the beamformer, alternative implementations are possible in which the contents of all data streams 307 and all data streams 311 is consolidated into a single data stream 400 (shown in FIG. 4), which is subsequently fed to the beamformer 320.

Figure 4:
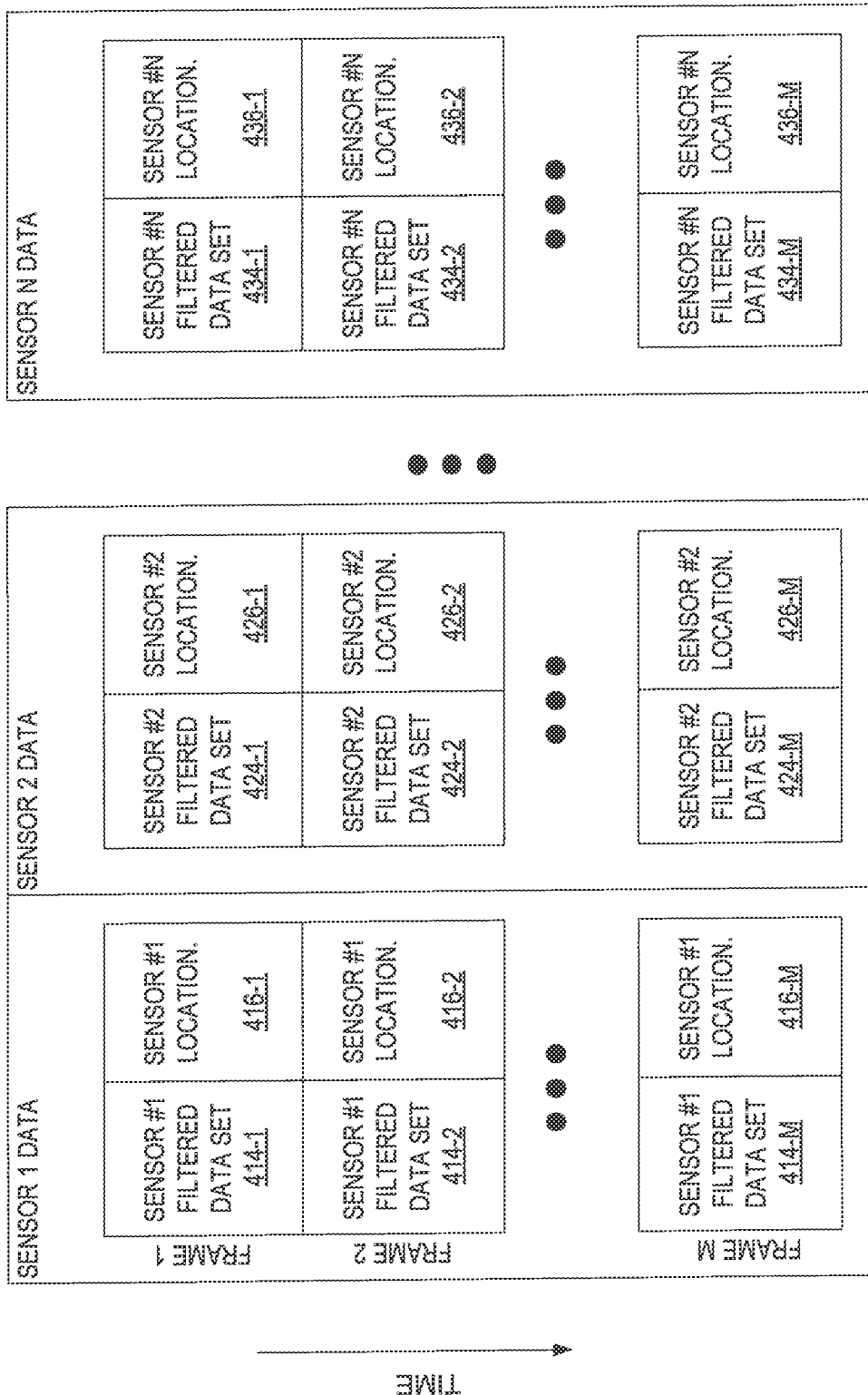
FIG. 4 is a diagram of an example of a data stream, according to aspects of the disclosure.

FIG. 4 shows a diagram of a data stream 400, according to aspects of the disclosure. As illustrated, the data stream 400 may include M frames, where M is any positive integer greater than one. Each frame may correspond to a different transmission interval 132. As such, each frame may be based on signals received by the sensors 112 during a particular 1-second time interval (i.e., a time interval that has substantially the same duration as the transmission intervals 132). More specifically, the data in each frame that is associated with a given sensor 112 (i.e., a filtered data set and an indication of sensor location) may be generated based on signals received by the given sensor 112 during a collection period corresponding to the sensor 112. In some implementations, the collection period may be one that: (i) starts when the sensor 112 has finished receiving a first tracking signal pair 128 and (ii) ends when the sensor has finished receiving a second tracking signal pair 128 that is transmitted immediately after the first tracking signal pair 128. Additionally or alternatively, in some implementations, the collection period may be one that: (i) starts when the sensor 112 has begun receiving a first tracking signal pair 128 and (ii) ends when the sensor has begun receiving a second tracking signal pair 128 that is transmitted immediately after the first tracking signal pair 128.

The first frame in the data stream 400 may include a data set 414-1 and an indication of phase offset 416-1. The data set 414-1 may include a plurality of samples corresponding to target signals that are generated by the sensor 112-1. As noted above, the data set 414-1 may be generated by zeroing out samples that belong to received tracking signals 124 and 126, causing the data set 414-1 to include only data that is free from interference by the tracking signals 124 and 126. The indication of phase offset 416-1 may indicate the phase offset (at the sensor 112-1) between the tracking signals 124 and 126 in a first tracking signal pair 128, wherein the first tracking signal pair 128 is transmitted in a first transmission interval 132.

The first frame in the data stream 400 may further include a data set 424-1 and an indication of phase offset 426-1. The data set 424-1 may include a plurality of samples corresponding to target signals that are generated by the sensor 112-2. As noted above, the data set 424-1 may be generated by zeroing out samples that correspond to the tracking signals 124 and 126, causing the data set 414-2 to include only data that is free from interference by the tracking signals 124 and 126. The indication of phase offset 426-1 may indicate the phase offset (at the sensor 112-2) between the tracking signals 124 and 126 in the first tracking signal pair 128.

The first frame in the data stream 400 may further include a data set 434-1 and an indication of phase offset 436-1. The data set 434-1 may include a plurality of samples corresponding to target signals that are received by the sensor 112-N. As noted above, the data set 434-1 may be generated by zeroing out samples that belong to received tracking signals 124 and 126, causing the data set 434-1 to include only data that is free from interference by the tracking signals 124 and 126. The indication of phase offset 436-1 may indicate the phase offset (at the sensor 112-N) between the tracking signals 124 and 126 in the first tracking signal pair 128.

The second frame in the data stream 400 may include a data set 414-2 and an indication of phase offset 416-2. The data set 414-2 may include a plurality of samples corresponding to target signals that are received by the sensor 112-1. As noted above, the data set 414-2 may be generated by zeroing out samples that belong to replicas of the tracking signals 124 and 126, causing the data set 414-2 to include only data that is free from interference by the tracking signals 124 and 126. The indication of phase offset 416-2 may indicate the phase offset (at the sensor 112-1) between the tracking signals 124 and 126 in a second tracking signal pair 128, wherein the second tracking signal pair 128 is transmitted in a second transmission interval 132.

The second frame in the data stream 400 may further include a data set 424-2 and an indication of phase offset 426-2. The data set 424-2 may include a plurality of samples corresponding to target signals that are received by the sensor 112-2. As noted above, the data set 424-2 may be generated by zeroing out samples that belong to received tracking signals 124 and 126, causing the data set 424-2 to include only data that is free from interference by the tracking signals 124 and 126. The indication of phase offset 426-2 may indicate the phase offset (at the sensor 112-2) between the tracking signals 124 and 126 in the second tracking signal pair 128.

The second frame in the data stream 400 may further include a data set 434-2 and an indication of phase offset 436-2. The data set 434-2 may include a plurality of samples corresponding to target signals that are received by the sensor 112-N. As noted above, the data set 434-2 may be generated by zeroing out samples that belong to received tracking signals 124 and 126, causing the data set 434-2 to include only data that is free from interference by the tracking signals 124 and 126. The indication of phase offset 416-2 may indicate the phase offset (at the sensor 112-N) between the tracking signals 124 and 126 in the second tracking signal pair 128.

The M-th frame in the data stream 400 may include a data set 414-M and an indication of phase offset 416-2. The data set 414-M may include a plurality of samples corresponding to target signals that are received by the sensor 112-1. As noted above, the data set 414-M may be generated by zeroing out samples that belong to received tracking signals 124 and 126, causing the data set 414-M to include only data that is free from interference by the tracking signals 124 and 126. The indication of phase offset 416-M may indicate the phase offset (at the sensor 112-1) between the tracking signals 124 and 126 in an M-th tracking signal pair 128, wherein the M-th tracking signal pair is transmitted in an M-th transmission interval 132.

The M-th frame in the data stream 400 may further include a data set 424-M and an indication of phase offset 426-M. The data set 424-M may include a plurality of samples corresponding to target signals that are received by the sensor 112-2. As noted above, the data set 424-M may be generated by zeroing out samples that belong to replicas of the tracking signals 124 and 126, causing the data set 424-M to include only data that is free from interference by the tracking signals 124 and 126. The indication of phase offset 426-M may indicate the phase offset (at the sensor 112-2) between the tracking signals 124 and 126 in the M-th tracking signal pair 128.

The M-th frame in the data stream 400 may further include a data set 434-M and an indication of phase offset 436-M. The data set 434-M may include a plurality of samples corresponding to target signals that are received by the sensor 112-N. As noted above, the data set 434-M may be generated by zeroing out samples that belong to replicas of the tracking signals 124 and 126, causing the data set 434-M to include only data that is free from interference by the tracking signals 124 and 126. The indication of phase offset 416-2 may indicate the phase offset (at the sensor 112-N) between the tracking signals 124 and 126 in the M-th tracking signal pair 128.

Stated succinctly, in some implementations, the data stream 400 may be arranged to correlate: (i) target data that is captured by any given one of the plurality of sensors 112 in the sensor array 108 during a collection period with (ii) a phase offset between tracking signals 124 and 126 that are received at the beginning or end of the collection period. Because the positions of the tracking signal transmitters 114 and 116 are known, the phase offset between the tracking signals 124 and 126 effectively indicates the location of the given sensor 112 during the period when the target data is captured.

According to the present disclosure, the data stream 400 may associate target data with phase offset data, when the data stream 400 is formatted in a way that permits the beamformer 220 to: (i) identify the target data that is captured using a given sensor 112 during a particular time window, and (ii) the phase offset between the tracking signals 124 and 126 in the same time window. In some implementations, the target data and the physical offset data may be correlated implicitly based on the ordering of the target data and the phase offset data. However, alternative implementations are possible in which the target data and the physical offset data be correlated using additional metadata that is provided within the data stream. Stated succinctly, the present disclosure is not limited to any specific method for associating target data with phase offset data.

Figure 5:
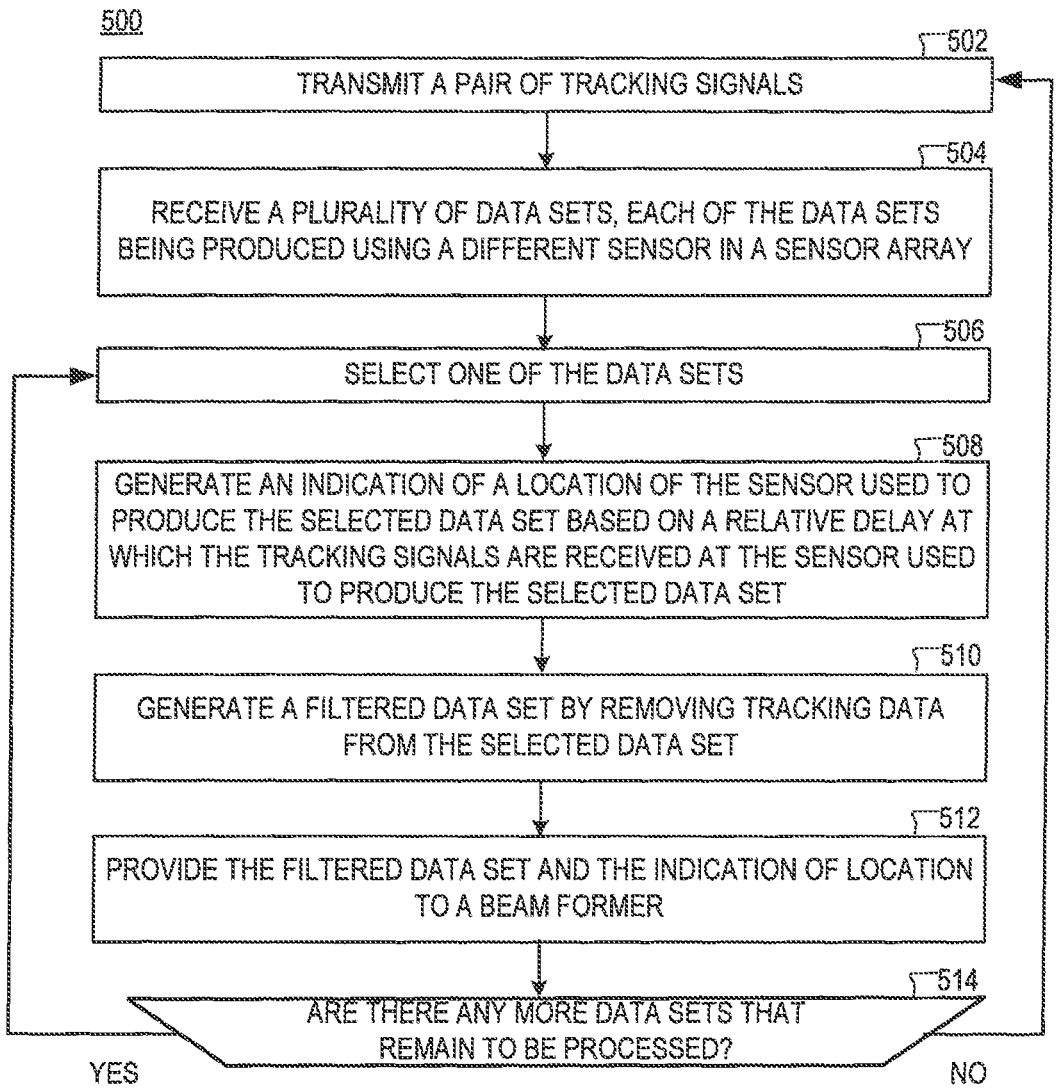
FIG. 5 is a flowchart of an example of a process, according to aspects of the disclosure.

FIG. 5 is a flowchart of an example of a process 500, according to aspects of the disclosure. The process 500 may be performed by a signal processor, such as the signal processor 210 or the signal processor 310. The process 500 is provided as an example only. At least some of the steps in the process 500 may be performed concurrently, in a different order, or altogether omitted.

At step 502, a first tracking signal and a second tracking signal are transmitted. In some implementations, the first tracking signal and the second tracking signal may be transmitted concurrently. In some implementations, the first and second tracking signals may be the same or similar to the tracking signals 124 and 126, which are discussed above with respect to FIGS. 1A-4. Additionally or alternatively, in some implementations, the first and second tracking signals may be transmitted by laterally-spaced transmitters that are mounted on a towing platform that is used to tow a sensor array. Additionally or alternatively, in some implementations, the transmitters may be the same or similar to the transmitters 114 and 116, which are discussed above with respect to FIGS. 1A-4.

At step 504, a plurality of data sets is retrieved. Each of the data sets may be generated using a different respective one of a plurality of sensors in a sensor array. Each of the data sets may include (i) a received first tracking signal that is generated by the data set's respective sensor in response to the transmission of the first tacking signal at step 502, (ii) a received second tracking signal that is generated by the data set's respective sensor in response to the transmission of the second tacking signal at step 502, and (iii) one or more target signals that are generated by the data set's respective sensor. In some implementations, the plurality of data sets may be the same or similar to a portion of a signal return of a sensor array, such as the portions of the signal return 202, which are discussed above with respect to FIG. 2. Additionally or alternatively, in some implementations, each of the data sets may be produced by digitizing a waveform that is provided by the data set's respective sensor. Additionally or alternatively, in some implementations, each of the sensors may be the same or similar to the sensors 112, which are discussed above with respect to FIGS. 1A-4. Additionally or alternatively, in some implementations, the sensor array may be the same or similar to the sensor array 108, which is discussed above with respect to FIGS. 1A-4.

In some implementations, each of the data sets may be collected by the data set's respective sensor during a respective collection period. In some implementations, the collection period may: (i) start when the sensor has finished receiving a preceding pair of tracking signals, and (ii) end when the sensor has finished receiving the pair of tracking signals that are transmitted at step 502, wherein no other tracking signals are received by the sensor during the collection period. Additionally or alternatively, in some implementations, the collection period may: (i) start when the sensor has begun receiving the pair of tracking signals transmitted at step 502, and (ii) end when the sensor has begun receiving a subsequent pair of tracking signals, wherein no other tracking signals are received by the sensor during the collection period.

At step 506 one of the data sets is selected.

At step 508, an indication is generated of the location of the selected data set's respective sensor. The indication of the sensor's location may be generated based on the relative delay at which the tracking signals transmitted at step 502 are received at the sensor. In some implementations, the relative delay may be equal to (or otherwise based on) the duration of the period starting when the first tracking signal is first received by the sensor and ending when the second tracking signal is first received by the sensor (or vice versa). In some implementations, the indication of the location of the sensor may include a phase offset between the first and second tracking signals. Although in the present example the phase offset between the received first and second tracking signals is used to represent the relative delay at which the first tracking signal and the second tracking signal are received, the present disclosure is not limited to any specific method for representing the relative delay at which the pair of tracking signals is received at the sensor. For instance, instead of using angular units (which are used to represent phase offset), the relative delay may be represented using time units. In such implementations, the relative delay at which any of the tracking signals is received may be determined by detecting a first time when the signal is transmitted, detecting a second time when the signal is received at a particular sensor, and subtracting the first time from the second time.

At step 510, a filtered data set is generated by removing, from the selected data set, the received first and second tracking signals leaving only the target signals that are detected by the data set's respective sensor. As noted above, the received first and second tracking signals may be differentiated from the target signals in the selected data set because the first tracking signal and the second tracking signal may have a higher SNR than the target signals. In some implementations, removing the received tracking from the selected data set may include replacing samples in the selected data set that correspond to the received tracking signals with zeroes (and/or another number).

At step 512, a determination is made if there are any data sets in the plurality obtained at step 504 that remain to be processed. If one or more of the plurality of data sets have not been processed yet, the process 500 returns to step 506 and steps 506-512 are repeated for another one of the plurality of data sets. If all data sets in the plurality of data sets have been processed, the process 500 returns to step 502. Although in the example of FIG. 5, multiple iterations of steps 506-514 are performed sequentially, it will be understood that alternative implementations are possible in which the iterations are performed in parallel. Stated succinctly, the present disclosure is not limited to any specific order of executing the steps in the process 500.

Figure 6:
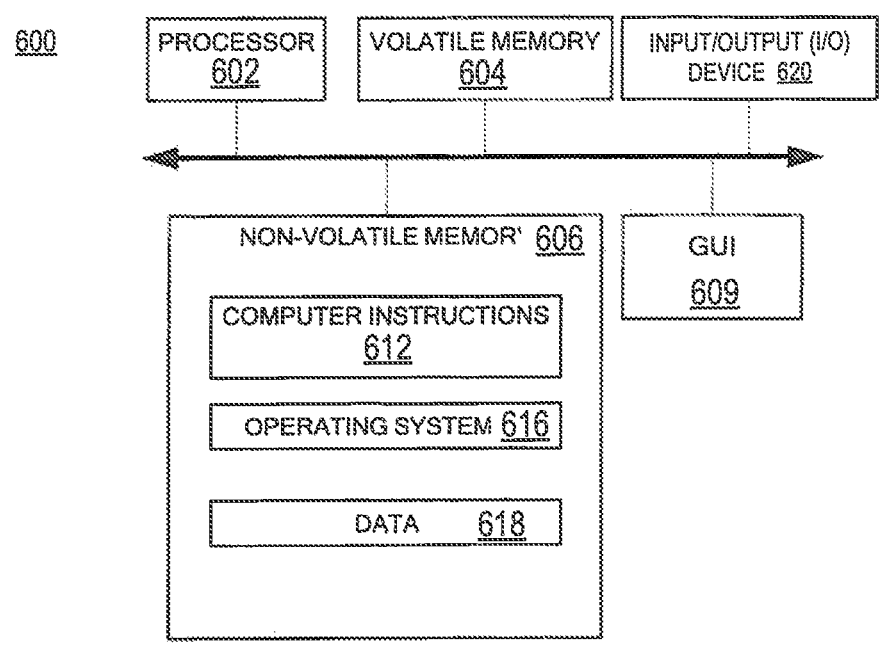
FIG. 6 is a diagram of an example of a computing device, according to aspects of the disclosure.

FIG. 6 is a diagram of an example of a computing device 600, according to aspects of the disclosure. Computing device 600 may include processor 602 (e.g., a general-purpose processor, an application-specific integrated circuit (ASIC), a field-programmable gate array (FPGA), etc.), volatile memory 604 (e.g., RAM), non-volatile memory 606 (e.g., a hard disk drive, a solid state drive such as a flash drive, a hybrid magnetic and solid state drive, etc.), graphical user interface (GUI) 609 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604. Program code may be applied to data entered using an input device of GUI 609 or received from I/O device 620.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the term product may include a physical object that is being bought and sold, a service, and/or anything else that can be purchased and solved. Although in the example of FIGS. 1-6, the sensors 112 are hydrophones, the present disclosure is not limited to any specific type of sensor. Although in the example of FIGS. 1-6, the sensor array 108 is a sonar array, it will be understood that the present disclosure is not limited to any specific type of sensor array. Those of ordinary skill in the art will readily recognize that the ideas presented throughout the disclosure can be applied in other fields that use sensor arrays to detect signals, such as seismology, for example. Although in the example of FIGS. 1-6, the duration of the tracking signals is 5 ms, the present disclosure is not limited to any specific duration for the tracking signals. Although in the example of FIGS. 1-6 the duration of the transmission intervals is 1 s, the present disclosure is not limited to any specific duration. The "target signals" discussed throughout the disclosure may include signals which the sensor array 108 is designed to receive, other than the tracking signals 124 and 126. As noted above, some target signals may have the same frequency as the target signals.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
   transmitting a pair of tracking signals, the pair of tracking signals including a first tracking signal and a second tracking signal, the first tracking signal being transmitted by a first transmitter, and the second tracking signal being transmitted by a second transmitter that is spaced apart from the first transmitter, wherein the first tracking signal includes a plurality of first pulses and the second tracking signal includes a plurality of second pulses, the first and second pulses being transmitted over a plurality of transmission intervals, such that in each transmission interval one first and one second pulses are transmitted, each of the first pulses has a duration that is at least one order of magnitude smaller than a duration of the transmission interval in which the first pulse is transmitted, and each of the second pulses has a duration that is at least one order of magnitude smaller than a duration of the transmission interval in which the second pulse is transmitted;
   generating a plurality of initial data streams, each of the initial data streams being associated with a given one of a plurality of hydrophones in a sonar array and including: (i) a respective received first tracking signal that is generated by the given one of a plurality of hydrophones in response to receiving the first tracking signal, (ii) a respective received second tracking signal that is generated by the given one of the plurality of hydrophones in response to receiving the second tracking signal, and (iii) a respective received target signal that is generated by the given one of the plurality of hydrophones, wherein the respective received target signal in at least one of the plurality of initial data streams has a same frequency as at least one of the first and second tracking signals;
   generating a plurality of phase offset data streams based on the plurality of initial data streams, each of the plurality of phase offset data streams including indications of a phase offset between the first and second tracking signals at a different one of the plurality of hydrophones;
   generating a plurality of filtered data streams by removing received first and second tracking signals from each of the plurality of initial data streams, wherein each of the plurality of filtered data streams is generated based on a different respective one of the plurality of initial data streams, the filtered data stream being generated by blanking out, from the respective initial data stream, samples that represent the received first and second tracking signals while retaining samples corresponding to the respective target signal that is part of the respective initial data stream;
   combining the plurality of filtered data streams and the plurality of phase offset data streams to produce a consolidated data stream; and
   providing the consolidated data stream to a beamformer.

2. The method of claim 1, wherein the consolidated data stream includes a plurality of data frames, each of the data frames including: (i) a plurality of filtered data sets and (ii) a plurality of indications of phase offset, each of the plurality of filtered data sets including data that is generated by a different one the plurality of hydrophones, and each of the indications of phase offset identifying the phase offset between the first and second tracking signals at a different one of the plurality of hydrophones.

3. The method of claim 2, wherein each of the data frames corresponds to a different transmission interval in which the first and second tracking signals are transmitted, and each of the plurality of data frames is generated based on signals produced by the plurality of hydrophones during a same transmission interval.

4. The method of claim 1, wherein each of the plurality of first pulses has a duration that is at least 200 times greater than the duration of the transmission interval in which the first pulse is transmitted.

5. The method of claim 1, wherein the first tracking signal and the second tracking signal are transmitted concurrently.

6. The method of claim 1, wherein blanking out samples that represent the received first and second tracking signals includes zeroing out the samples.

7. The method of claim 1, wherein the respective received target signal and at least one of the respective first and second tracking signals in at least one of the plurality of initial data streams are within an operational frequency band of the sonar array.

8. The method of claim 1, wherein the sonar array includes a towed sonar array, and only one first pulse and only one second pulse are transmitted in each of the plurality of transmission intervals.

9. A system comprising:
   a first transmitter configured to transmit a first tracking signal over a plurality of transmission intervals, the first tracking signal including a plurality of first pulses, such that one first pulse is transmitted in each of the plurality of transmission intervals, each first pulse having a duration that is at least an order of magnitude smaller than a duration of the transmission interval in which the first pulse is transmitted;

a second transmitter configured to transmit a second tracking signal over the plurality of transmission intervals, the second transmitter being spaced apart from the first transmitter, the second tracking signal including a plurality of second pulses, such that one second pulse is transmitted in each of the plurality of transmission intervals, each second pulse having a duration that is at least an order of magnitude smaller than a duration of the transmission interval in which the second pulse is transmitted;

a sonar array; and at least one processor configured to perform the operations of:

generating a plurality of initial data streams, each of the initial data streams being associated with a given one of a plurality of hydrophones in the sonar array and including: (i) a respective received first tracking signal that is generated by the given one of a plurality of hydrophones in response to receiving the first tracking signal, (ii) a respective received second tracking signal that is generated by the given one of the plurality of hydrophones in response to receiving the second tracking signal, and (iii) a respective received target signal that is generated by the given one of the plurality of hydrophones, wherein the respective received target signal in at least one of the plurality of initial data streams has a same frequency as at least one of the first and second tracking signals;

generating a plurality of phase offset data streams based on the plurality of initial data streams, each of the plurality of phase offset data streams including indications of a phase offset between the first and second tracking signals at a different one of the plurality of hydrophones;

generating a plurality of filtered data streams by removing received first and second tracking signals from each of the plurality of initial data streams, wherein each of the plurality of filtered data streams is generated based on a different respective one of the plurality of initial data streams, the filtered data stream being generated by blanking out, from the respective initial data stream, samples that represent the received first and second tracking signals;

combining the plurality of filtered data streams and the plurality of phase offset data streams to produce a consolidated data stream; and providing the consolidated data stream to a beamformer.

10. The system of claim 9, wherein the consolidated data stream includes a plurality of data frames, each of the data frames including: (i) a plurality of filtered data sets and (ii) a plurality of indications of phase offset, each of the plurality of filtered data sets including data that is generated by a different one the plurality of hydrophones, and each of the indications of phase offset identifying the phase offset between the first and second tracking signals at a different one of the plurality of hydrophones.

11. The system of claim 10, wherein each of the data frames corresponds to a different transmission interval in which the first and second tracking signals are transmitted, and each of the plurality of data frames is generated based on signals produced by the plurality of hydrophones during a same transmission interval.

12. The system of claim 9, wherein each of the plurality of first pulses has a duration that is at least 200 times greater than the duration of the transmission interval in which the first pulse is transmitted.

13. The system of claim 9, wherein the first tracking signal and the second tracking signal are transmitted concurrently.

14. The system of claim 9, wherein blanking out samples that represent the received first and second tracking signals includes zeroing out the samples.

15. The system of claim 9, wherein the first tracking signal and the second tracking signal have the same frequency.

16. The system of claim 9, wherein the respective received target signal and at least one of the respective first and second tracking signals in at least one of the plurality of initial data streams are within an operational frequency band of the sonar array.

17. The system of claim 9, wherein the sonar array includes a towed sonar array, only one first pulse and only one second pulse are transmitted in each of the plurality of transmission intervals, and each of the filtered data streams includes samples corresponding to the respective target signal that is part of the initial data stream used as a basis for generating the filtered data stream.

18. A non-transitory computer-readable medium storing one or more processor-executable instructions, which when executed by at least one processor cause the at least one processor to perform the operations of:

transmitting a pair of tracking signals, the pair of tracking signals being transmitted over a plurality of transmission intervals, the pair of tracking signals including a first tracking signal and a second tracking signal, the first tracking signal being transmitted by a first transmitter, and the second tracking signal being transmitted by a second transmitter that is spaced apart from the first transmitter, wherein the first tracking signal includes a plurality of first pulses and the second tracking signal includes a plurality of second pulses, the first and second pulses being transmitted over a plurality of transmission intervals, such that in each transmission interval one first and one second pulses are transmitted, each of the first pulses has a duration that is at least one order of magnitude smaller than a duration of the transmission interval in which the first pulse is transmitted, and each of the second pulses has a duration that is at least one order of magnitude smaller than a duration of the transmission interval in which the second pulse is transmitted;

generating a plurality of initial data streams, each of the initial data streams being associated with a given one of a plurality of hydrophones in a sonar array and including: (i) a respective received first tracking signal that is generated by the given one of a plurality of hydrophones in response to receiving the first tracking signal, (ii) a respective received second tracking signal that is generated by the given one of the plurality of hydrophones in response to receiving the second tracking signal, and (iii) a respective received target signal that is generated by the given one of the plurality of hydrophones, wherein the respective received target signal in at least one of the plurality of initial data streams has a same frequency as at least one of the first and second tracking signals;

generating a plurality of phase offset data streams based on the plurality of initial data streams, each of the plurality of phase offset data streams including indications of a phase offset between the first and second tracking signals at a different one of the plurality of hydrophones;

generating a plurality of filtered data streams by removing received first and second tracking signals from each of the plurality of initial data streams;

combining the plurality of filtered data streams and the plurality of phase offset data streams to produce a consolidated data stream; and providing the consolidated data stream to a beamformer.

19. The non-transitory computer-readable medium of claim 18, wherein the consolidated data stream includes a plurality of data frames, each of the data frames including: (i) a plurality of filtered data sets and (ii) a plurality of indications of phase offset, each of the plurality of filtered data sets including data that is generated by a different one the plurality of hydrophones, and each of the indications of phase offset identifying the phase offset between the first and second tracking signals at a different one of the plurality of hydrophones.

20. The non-transitory computer-readable medium of claim 19, wherein the respective received target signal and at least one of the respective first and second tracking signals in at least one of the plurality of initial data streams are within an operational frequency band of the sonar array.

* * * * *